[11] 3,601,474

| [72] | Inventor | Georg Knetsch<br>Berghausen, Germany |
|---|---|---|
| [21] | Appl. No. | 54,472 |
| [22] | Filed | July 13, 1970 |
| [45] | Patented | Aug. 24, 1971 |
| [73] | Assignee | Ernst Leitz GmbH<br>Wetzlar, Germany |
| [32] | Priority | July 19, 1969 |
| [33] | | Germany |
| [31] | | P 19 36 895.7 |

[54] TRIPLET OBJECTIVE
1 Claim, 1 Drawing Fig.

[52] U.S. Cl. .................................................. 350/227, 350/176

[51] Int. Cl. ...................................................... G02b 9/14
[50] Field of Search ............................................ 350/227

[56] References Cited
UNITED STATES PATENTS
1,939,098  12/1933  Berek .......................... 350/227

*Primary Examiner*—John K. Corbin
*Attorney*—Krafft & Wells

ABSTRACT: An objective specially designed for a field angle of approximately 30° and having a large relative opening of at least f:2.8 comprises three separate lens elements, each of which being assembled from two single lenses of opposite refractive power which are cemented together.

PATENTED AUG 24 1971
3,601,474
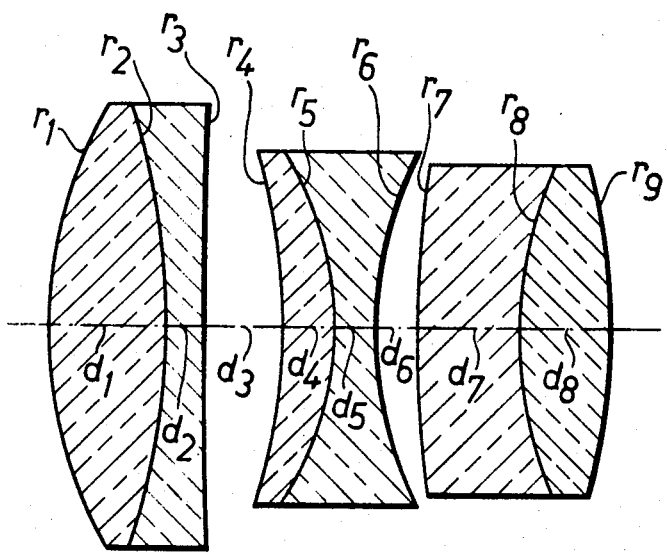
GEORG KNETSCH
INVENTOR
BY
Krafft + Wells

TRIPLET OBJECTIVE

BACKGROUND OF THE INVENTION

The present invention relates to objectives, particularly to objectives comprising three separate lenses or lens elements and therefore being known as triplets.

Objectives of this type are already disclosed, for example, in the U.S. Pat. No. 1,939,098 and in the German Pat. Nos. 526,307 and 526,308.

It is an object of the present invention to improve on this type of objectives in the sense of increasing the field angle and the relative opening thereof. It is a further object to provide a triplet objective of which the same excellent state of correction prevails throughout a large image field down to an image scale of 1:1.

BRIEF DESCRIPTION OF THE DRAWING

The single FIGURE illustrates the preferred form of construction of an objective according to the present invention

SUMMARY OF THE INVENTION

The above-stated objects are attained by an objective which is constructed according to the data given in the table below wherein the thicknesses, spacings and radii are provided in multiples of the focal length of the objective, and wherein $r_1$ to $r_9$—represents the radii of successive lens surfaces, $d_1$ to $d_8$—represents the axial thicknesses of the respective lenses, $n_e$ and $v_3$—represent the refractive indices and Abbe numbers of the lens materials respectively, and $\Delta n/r$—represents the refractive power of the respective lens surface, which data could also be written as $n'-n/r$ wherein $n'$ is the refractive index of the material behind the surface, $n$ is the refractive index of the material in front of the surface, and $r$ is the radius of the surface.

The table is to be read in connection with the drawing which represents a view of an objective incorporating the invention and cut along the optical axis.

|  |  | $n_e$ | $v_e$ | $\Delta n / r$ |
|---|---|---|---|---|
| $r_1 = +0.40218$ | $d_1 = 0.1007$ | 1.69282 | 49.45 | +1.7227 |
| $r_2 = -0.5998$ |  |  |  | +0.1563 |
| $r_3 = -6.40992$ | $d_2 = 0.0325$ | 1.59910 | 38.98 | −0.0935 |
|  | $d_3 = 0.0724$ |  |  |  |
| $r_4 = -0.53278$ | $d_4 = 0.0474$ | 1.8114 | 31.02 | −1.5230 |
| $r_5 = -0.26701$ | $d_5 = 0.0345$ | 1.69416 | 30.92 | +0.4391 |
| $r_6 = +0.34854$ |  |  |  | −1.9916 |
| $r_7 = +1.18706$ | $d_6 = 0.0372$ |  |  | +0.5288 |
|  | $d_7 = 0.0889$ | 1.62767 | 36.51 |  |
| $r_8 = +0.37699$ | $d_8 = 0.0738$ | 1.7548 | 39.54 | +0.3372 |
| $r_9 = -0.67400$ |  |  |  | +1.1199 |

What is claimed is:

1. A triplet objective having a relative opening of at least $f{:}2.8$ and a field angle of approximately 30° comprising three lens members, each member being cemented together from two single lenses having opposite refractive power, said lens members having substantially the following approximate specifications:

|  |  | $n_e$ | $v_e$ | $\Delta n / r$ |
|---|---|---|---|---|
| $r_1 = +0.40218$ | $d_1 = 0.1007$ | 1.69282 | 49.45 | +1.7227 |
| $r_2 = -0.5998$ |  |  |  | +0.1563 |
| $r_3 = +6.40992$ | $d_2 = 0.0325$ | 1.59910 | 38.98 | −0.0935 |
|  | $d_3 = 0.0724$ |  |  |  |
| $r_4 = -0.53278$ | $d_4 = 0.0474$ | 1.8114 | 31.02 | −1.5230 |
| $r_5 = -0.26701$ | $d_5 = 0.0345$ | 1.69416 | 30.92 | +0.4391 |
| $r_6 = +0.34854$ |  |  |  | −1.9916 |
| $r_7 = +1.18706$ | $d_6 = 0.0372$ |  |  | +0.5288 |
|  | $d_7 = 0.0889$ | 1.62767 | 36.51 |  |
| $r_8 = +0.37699$ | $d_8 = 0.0738$ | 1.7548 | 39.54 | +0.3372 |
| $r_9 = -0.67400$ |  |  |  | +1.1199 | wherein the data given for the thicknesses, spacings and radii are expressed in multiples of the focal length of the objective.